United States Patent
Lambert et al.

(10) Patent No.: US 7,889,630 B2
(45) Date of Patent: *Feb. 15, 2011

(54) RECORD CARRIER

(75) Inventors: Nicolaas Lambert, Eindhoven (NL);
Adrianus Johannes Maria Denissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1294 days.

This patent is subject to a terminal disclaimer.

(21) Appl. No.: 10/533,730

(22) PCT Filed: Oct. 14, 2003

(86) PCT No.: PCT/IB03/04549

§ 371 (c)(1),
(2), (4) Date: May 3, 2005

(87) PCT Pub. No.: WO2004/042716

PCT Pub. Date: May 21, 2004

(65) Prior Publication Data

US 2006/0072440 A1      Apr. 6, 2006

(30) Foreign Application Priority Data

Nov. 6, 2002   (NL) .................................. 1021862

(51) Int. Cl.
*G11B 7/24*   (2006.01)

(52) U.S. Cl. ................ 369/275.1; 369/275.3; 347/263; 347/224

(58) Field of Classification Search ............... 369/275.1
See application file for complete search history.

(56) References Cited

U.S. PATENT DOCUMENTS

| | | | | | |
|---|---|---|---|---|---|
| 4,972,401 | A | * | 11/1990 | Carasso et al. | 369/47.49 |
| 5,418,764 | A | * | 5/1995 | Roth et al. | 369/30.04 |
| 5,608,717 | A | * | 3/1997 | Ito et al. | 369/275.3 |
| 5,941,649 | A | * | 8/1999 | Hansel et al. | 400/703 |
| 6,325,950 | B1 | * | 12/2001 | Hosokawa et al. | 264/1.33 |
| 6,388,962 | B1 | * | 5/2002 | Mons | 369/44.26 |
| 7,164,633 | B2 | * | 1/2007 | Iida et al. | 369/47.27 |
| 7,538,787 | B2 | * | 5/2009 | Lambert et al. | 347/224 |
| 2002/0012315 | A1 | * | 1/2002 | Iida et al. | 369/275.1 |
| 2002/0105888 | A1 | * | 8/2002 | Levich et al. | 369/94 |

(Continued)

FOREIGN PATENT DOCUMENTS

EP      0397238 A1    8/1990

(Continued)

OTHER PUBLICATIONS

ISR for Publication, International Publication No. WO2004/042716.

*Primary Examiner*—Daniell L Negrón
*Assistant Examiner*—Kezhen Shen

(57) ABSTRACT

The invention relates to a record carrier (1) comprising an area for storing data, the record carrier adhering to a pre-defined, standardized condition with respect to a physical parameter. The record carrier comprises parameter information on the physical parameter, which parameter information is of a higher precision than the precision of the physical parameter mentioned in the pre-defined, standardized condition. Using this high precision parameter information, it is possible to derive the exact position of a visible image pixel data making up a label. This parameter information thus enables a recorder to write a visible label on the record carrier according to the invention.

19 Claims, 4 Drawing Sheets

U.S. PATENT DOCUMENTS

Figure 1:
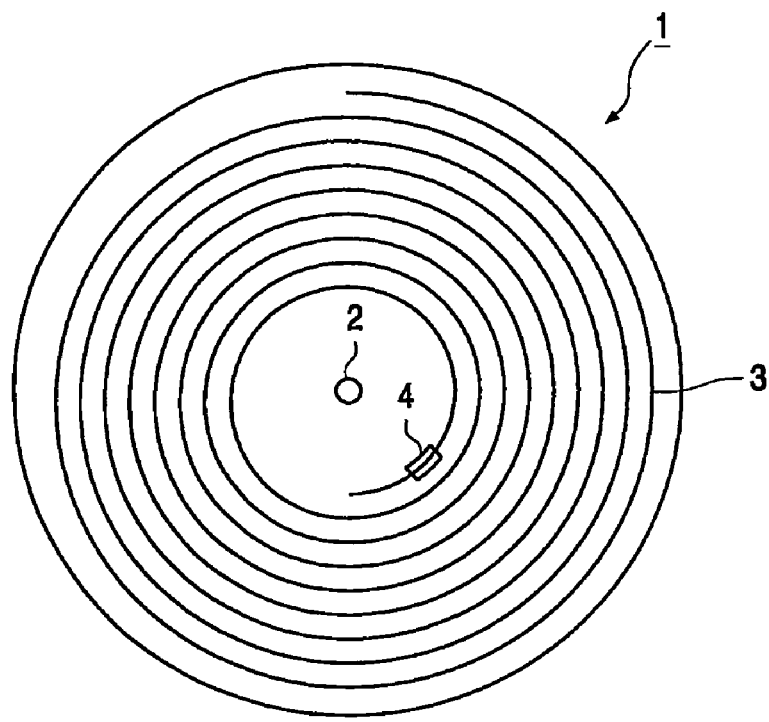

| | | | |
|---|---|---|---|
| 2004/0017746 A1* | 1/2004 | Takeda et al. | 369/47.35 |
| 2004/0052202 A1* | 3/2004 | Brollier | 369/273 |

FOREIGN PATENT DOCUMENTS

| | | |
|---|---|---|
| EP | 0397238 B1 | 11/1990 |
| EP | 1128366 A1 | 8/2001 |
| WO | WO 02/17316 A1 | 2/2002 |
| WO | WO 02/41316 A1 | 5/2002 |

\* cited by examiner

| Parameter | Nominal value | Range | Unit | Remarks |
|---|---|---|---|---|
| Starting diameter of the Data area $D_0$ | 48.0 | + 0.0, - 0.4 | mm | |
| Track pitch $D_{tp}$ | 0.74 | ±0.01 | µm | averaged over whole disc |
| | 0.74 | ±0.03 | µm | maximum deviation |
| Channel bit length $L_{cb}$ | 133.3 | ±1.4 | nm | averaged over whole disc |

FIG. 2

| Parameter | Nominal value | Range | Unit | Remarks |
|---|---|---|---|---|
| Inner radius $R_0$ | 22.0 | | mm | start of groove tracks, start of Lead-in |
| | 24.0 | + 0.0, - 0.2 | mm | first address in Information/Data Zone |
| Track pitch $D_{tp}$ | 0.74 | ±0.01 | µm | averaged over the Information Zone |
| | 0.74 | ±0.03 | µm | maximum deviation |
| Channel bit length $L_{cb}$ | 133.3 | ±1.4 | nm | averaged channel bit lenght over each RUN |

FIG. 3

RECORD CARRIER

The invention relates to a record carrier comprising an area for storing data, the area comprising a pattern of tracks for storing the data in the form of marks, the record carrier adhering to a pre-defined, standardized condition with respect to a physical parameter.

A record carrier of this type is well known, for example from the standardized rewritable and/or recordable optical record carriers CD-R, CD-RW, DVD+R or DVD+RW, or the read-only CD-Audio disc. The data on this type of record carriers is written in a continuous clock-wise spiral from the inner radius to the outside radius. The documents in which these standardized optical record carriers are described (so-called standard specifications) specify conditions with respect to physical parameters these record carriers must adhere to, like for example the inner radius, the track pitch and the channel bit length The nominal value of these parameters is sometimes also stored on the record carrier, for example in a lead-in area.

It is an object of the invention to realize a record carrier that enables a standard drive to more easily read data from the record carrier or write data on the record carrier, for example for writing a visible label on the record carrier.

According to the invention, this object is achieved by a record carrier that is characterized in that the record carrier comprises parameter information on the physical parameter, which parameter information is of a higher precision than the precision of the physical parameter mentioned in the pre-defined, standardized condition.

In order to be able to identify and find a particular record carrier, it is necessary that the user of these record carriers consistently labels his otherwise anonymous record carriers before or after recording. In general, the average user does not do this very diligently. In order to overcome this problem, it would be convenient if a visible label can be written during the recording of the information on the record carriers. However, such a standardized record carrier has as a drawback that a known standard drive for recording data on such a record carrier cannot write a visible label on it. In order to be able to write a label on a record carrier, it is crucial to know exactly where the written visible image pixels data making up the label end up on the record carrier area, as the pixels must be written in a two-dimensionally co-ordinated way. The inventors have recognized, inter alia, that due to fact that the standard specifications for read-only, recordable and rewritable media only specify this physical parameter to a certain precision, small errors in this parameter will cause a significant distortion in the label written on the record carrier. An apparent insignificant inaccuracy in such a physical parameter will thus have large consequences for the label writing process. The inventors indeed found that due to this, a label in the form of a block got warped into a hardly recognizable spiral pattern. From this the inventors have drawn the conclusion that a more accurate indication of certain physical parameters was needed. These physical parameters can be used by a standard drive for determining the entire mapping of the channel bits over the record carrier and thus also for determining where the written visible image pixels data making up the label end up on the record carrier.

A preferred embodiment of the record carrier according to the invention is characterized in that the parameter information is to be used for assisting writing a visible label on the record carrier.

It must be noted that writing a visible label on the record carrier according to the invention is only one possible application. The parameter information can also be used for fast retrieval of the data stored on the record carrier or for additional certainty on the exact position on which data is to be written, e.g. in defect management schemes.

A further embodiment of the record carrier according to the invention is characterized in that the physical parameter is the track pitch of the record carrier. A further embodiment is characterized in that the average track pitch, according to the pre-defined, standardized condition with respect to the track pitch, when expressed in micrometer, is expressed in two decimals, and that the information on the track pitch stored on the record carrier, when expressed in micrometer, is indicated in at least three decimals. Another further embodiment characterized in that the record carrier is a DVD-RW disc or a DVD+RW disc, and the average track pitch is 0.74 μm. These embodiments have as an important advantage that by storing on the record carrier the track pitch in a highly accurate manner, at least more accurate than the requirements of the track pitch imposed on the record carrier, it is possible to accurately calculate the tangential position on the record carrier where the label data end up on the record carrier. For example, according to the DVD-RW and DVD+RW specification, the average track pitch is indicated in two decimals, 0.74 μm. On the record carrier according to the invention can be stored a more accurate average track pitch, for example 0.737 μm. As another example of this higher accuracy: the inventors have measured for a specific batch of DVD-RW discs a track pitch of 0.7443251 μm.

A further embodiment of the record carrier according to the invention is characterized in that the physical parameter is the channel bit length. A further embodiment is characterized in that the average channel bit length, according to the pre-defined, standardized condition with respect to the channel bit length, when expressed in nanometer, is expressed in one decimal, and that the information on the channel bit length stored on the record carrier, when expressed in nanometer, is indicated in at least two decimals. A further embodiment is characterized in that the record carrier is a DVD-RW disc or a DVD+RW disc, and the average channel bit length is 133,3 nm. As an example of this higher accuracy: the inventors have measured for a specific batch of DVD-RW discs an average channel bit length of 134.11443 nm. These embodiments have as an important additional advantage that if the channel bit length is known with a high precision, rotational distortion of the label to be written can be prevented. It can be understood that due to a small inaccuracy in the channel bit length, it will become very difficult to calculate the exact radial position of a certain label pixel.

A further embodiment of the record carrier according to the invention is characterized in that the physical parameter is the inner radius of the record carrier. A further embodiment is characterized in that the inner radius, according to the pre-defined, standardized condition with respect to the inner radius, when expressed in millimeters, is expressed in one decimal, and that the information on the inner radius stored on the record carrier, when expressed in millimeters, is indicated in at least two decimals. A further embodiment is characterized in that the record carrier is a DVD-RW disc or a DVD+RW disc, and the inner radius is 24.0 mm. These embodiments have as an important additional advantage that knowledge of exact position of the inner radius will enable determining the tangential position of a certain label pixel in an accurate manner.

The high precision parameter information can be obtained in many different ways. If the mastering process can be very properly controlled, it is possible to store the parameter information on the record carrier during mastering. In a further embodiment, the parameter information is stored in a wobble.

A wobble is a continuous sinusoidal deviation of the track from the average centerline. A record carrier comprising such a sinusoidal deviation is for example known from U.S. Pat. No. 4,972,401 (=PHN 9666), which document is hereby incorporated by reference. In another embodiment, the parameter information is stored in pits embossed on the lands, so-called pre-pits. These embodiments have as an advantage that the parameter information can be incorporated into already existing storage techniques. The use of a wobble for storing data is for example used in the DVD+RW disc and the use of pre-pits for storing data is for example used in the DVD-RW disc. It is also possible to store the parameter information after mastering of the record carrier. When storing the parameter information in a wobble or in pre-pits, it is advantageous when, for this use, a special area on the record carrier is defined. In this way, it is possible to reliably retrieve the parameter information, even without having exact knowledge on the physical parameters of the record carrier itself.

In another embodiment of the record carrier according to the invention, the parameter information is stored in a pre-defined data field on the record carrier. This embodiment has as an advantage that the parameter information can be reliably retrieved. Preferably, this pre-defined data field is situated in the lead-in of the record carrier, e.g. in the Disc Manufacturing Information field in the lead-in.

In another embodiment, the record carrier according to the invention comprises a further area comprising an integrated circuit, the parameter information being stored in the integrated circuit. A record carrier on which an integrated circuit is present is for example known from International application with international publication number WO 02/17316 A1 (=PH-NL010233), which document is hereby incorporated by reference. This embodiment has as an advantage that the parameter information can be stored after mastering of the record carrier. This high precision parameter information can be stored on the record carrier even if the mastering process cannot be controlled very accurately, as the value of the physical parameter is determined by measuring the produced record carrier and the corresponding parameter information is afterwards stored in the integrated circuit. The embodiment further has as an advantage that the parameter information present in an integrated circuit can be read out even before the player is capable of reading out the data present in the data area.

These and other aspects of the invention are apparent from and will be elucidated with reference to the embodiments described hereinafter.

Figure 5:
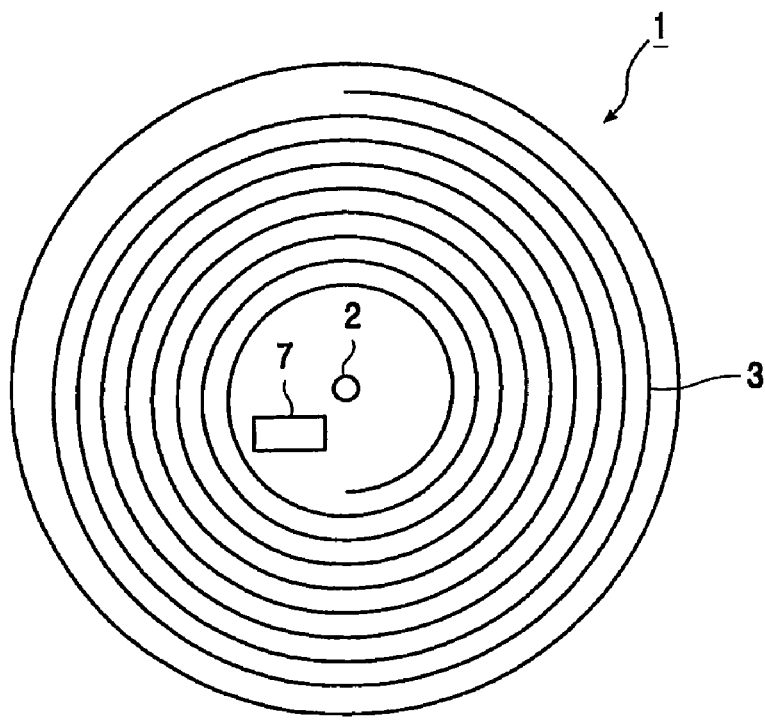
Figure 4:
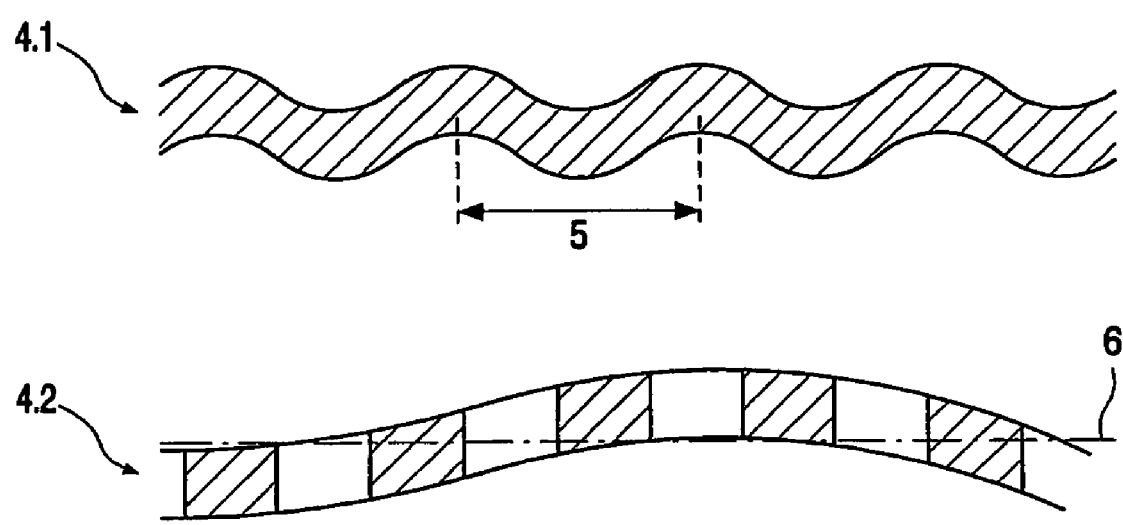
Figure 6A:
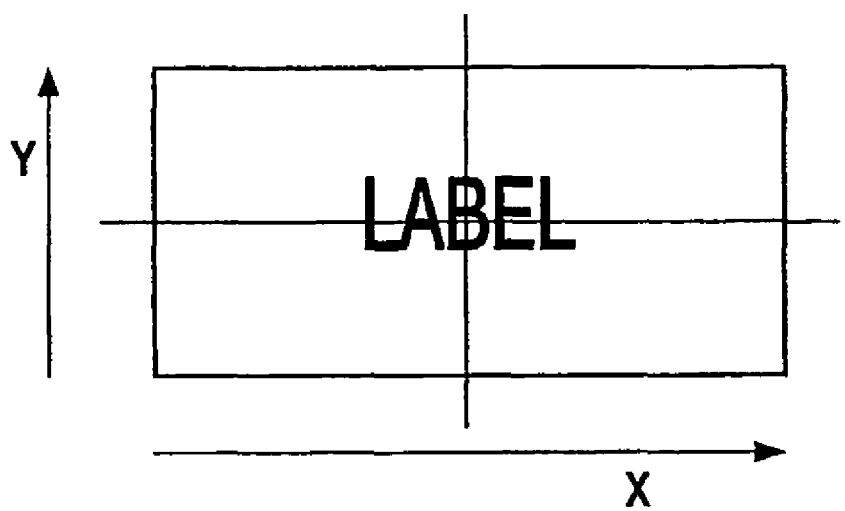
Figure 6B:
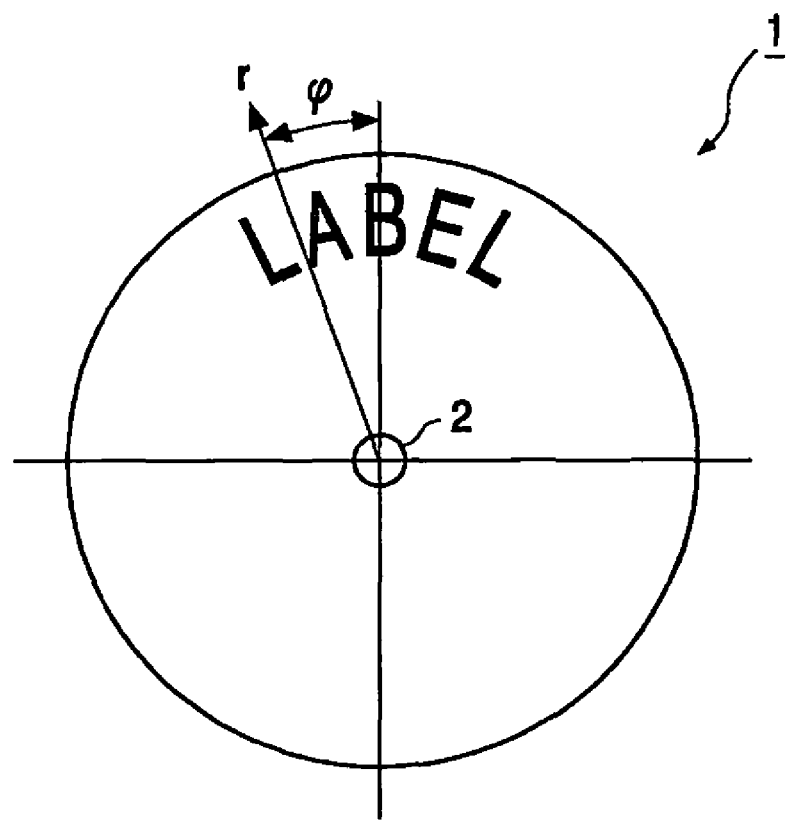

In the drawings:

FIG. 1 shows diagrammatically an embodiment of the record carrier according to the invention, FIG. 2 shows a table comprising parameter tolerances for a DVD-RW disc, FIG. 3 shows a table comprising parameter tolerances for a DVD+RW disc, FIG. 4 shows two embodiments of the record carrier according to the invention in which the parameter information is stored in a physical deviation of the track, FIG. 5 shows an embodiment of the record carrier according to the invention comprising an integrated circuit in which the parameter information is stored, FIG. 6 shows a possible application of the visible label, which can be written, on the record carrier according to the invention.

FIG. 1 shows a recordable record carrier 1, for example a DVD+RW like disc, having a central aperture 2 and data area 3. The data to be stored on recordable optical media like CD-R or DVD-RW is written in a continuous clock-wise spiral from the inner radius to the outside. The first part of the data area is reserved as lead-in area with various special purposes. After that comes the usable data area, which in turn is followed by a lead-out area. When recording a record carrier, some parts of the lead-in area are updated, the data area is written, and after the last valid data area a lead-out area is written. As mentioned above, in order to be able to write a visible image on the record carrier, it is crucial to know exactly where written data end up on the data area 3.

In order to know where the channel bits end-up on the data area 3, it is necessary to analyze the way a standardized record carrier is defined. Recordable and rewritable media are mastered with a groove and sector address indication (e.g. in the rewritable DVD+RW disc a wobbling groove is used for sector address indication; in the recordable DVD-R disc pre-pit information relating to the sector address is present in the land). The standard specification for these media generally prescribes the physical layout in terms of inner radius $R_0$, track pitch $D_{tp}$ and channel bit length $L_{cb}$, but does not define the details of the disc mastering. The inner radius $R_0$ is the radius on a record carrier at which the information area begins. The data area normally comprises three areas, the lead-in area, a data recording area and a lead-out area. The track pitch $D_{tp}$ is the distance between adjacent tracks measured in the radial direction. The channel bit length $L_{cb}$ is the unit length T of a channel bit. For example in DVD, the minimum recording pit length is equal to three times the channel bit length, 3T, and the maximum recording pit length is equal to eleven times the channel bit length, 11T. Given these parameters, however, it is in principle possible to figure out the entire mapping of the channel bits over the record carrier, if it is assumed that the data density is exactly uniform over the disc, i.e. a spiral with perfectly constant track pitch $D_{tp}$ and channel bit length $L_{cb}$, and that starts exactly at inner radius $R_0$. For a spiral, the radius r grows with a single track pitch $D_{tp}$ for every revolution, so r simply depends linearly on the cumulative angle $\Phi$:

$$r(\Phi)=R_0+D_{tp}\Phi/2\pi$$

By integrating along the track length, we find the relation between bit string position l and the cumulative angle $\Phi$:

$$lL_{cb}=\int r(\Phi)d\Phi=\int(R_0+D_{tp}\Phi/2\pi)d\Phi=R_0 D_{tp}\Phi^2/4\pi$$

Solving for $\Phi$ yields:

$$\Phi(l)=2\pi\{\sqrt{(lL_{cb}D_{tp}/\pi+R_0^2)}-R_0\}/D_{tp}$$

and $$r(l)=\sqrt{(lL_{cb}D_{tp}/\pi+R_0^2)}$$

The problem is that the inner radius $R_0$, track pitch $D_{tp}$ and channel bit length $L_{cb}$ are known only to a certain precision. This is indicated in FIGS. 2 and 3, which shows a table comprising parameter tolerances for a DVD-RW disc and for a DVD+RW disc. For the radius r(l) this is not always a problem, as the specified precision is sufficient for most practical purposes. Small relative errors in $\Phi(l)$, however, give rise to disastrous errors in the reduced angle $\phi$:

$$\phi(l)=\Phi(l) \bmod 2\pi.$$

E.g. a DVD disc uses more than 40.000 revolutions from the inner radius to the outer radius. Hence a relative error of 1% in $\Phi(l)$ corresponds to more than 40000% error in $\phi(l)$: a 1% error in $\Phi(l)$ causes the label image to be rotationally warped over more than 400 revolutions! The problem is of course that a tiny miscalculation of the data length per revolution accumulates to a huge error after 40000 revolutions. In experiments, the inventors found indeed errors of this magnitude: a nominal block pattern in the radius r(l) looks perfectly all right, but a nominal 180° block pattern in the reduced angle Φ(l) gets warped into a hardly recognizable spiral pattern. From this the inventors drew the conclusion that more accurate information on the physical parameters used for determining the position of the data pixels is needed.

Closer inspection of the equation for Φ(l) shows that the three constants $R_0$, $D_{tp}$ and $L_{cb}$ result in only two media master specific parameters A and B:

$$\Phi(l) = \sqrt{(Al+B^2)} - B$$

with $$A = 4\pi \cdot L_{cb}/D_{tp}$$

$$B = 2\pi R_0/D_{tp}$$

A more intuitive explanation for a two parameter description is that the linear spiral can be defined by the amount of data that is written in the first revolution of the track, and the fixed growth of that amount per revolution (this leaves the scale of the spiral as a third parameter, but the scale does not affect the rotational warp and therefore does not have to be known at great precision). This simple two parameter problem can give rise to rather spectacular but undesirable warp patterns when the parameters are slightly off.

Experiments showed that several iterations in the visual calibration procedure are needed to achieve the required sub-ppm precision in A and B for less than 1 nm distortion in the visible label. It was found that the result of the two parameter iterative fit procedure is not only reproducible within one disc, but even between several rewritable discs bought in a single pack. Apparently discs from a single batch tend to come from a single master template.

FIG. 4 shows two embodiments of the record carrier according to the invention in which the parameter information is stored in a physical deviation of the track. In this Figure, an enlargement of box 4 indicated in FIG. 1, two possible implementations of such a physical deviation are depicted. In these implementations the parameter information is stored in the lead-in of the record carrier. Track 4.1 shows a track in which the parameter information is stored as a width variation of the track. This variation has a certain length, indicated with the reference number 5. The parameter information can be read out from the record carrier using the tracking signals available in a standard device for reading out record carriers, e.g. a CD or DVD player. Track 4.2 shows a track in which the parameter information is stored as in the form of a deviation of the track from the average centerline 6. Such a deviating track, which is generally called a wobble, is used in different standardized optical record carriers, like e.g. the CD-R disc and the DVD+RW disc. Additional information can be found in the already mentioned U.S. Pat. No. 4,972,401 (=PHN 9666).

FIG. 5 shows an embodiment of the record carrier according to the invention comprising an integrated circuit 7 in which the parameter information is stored. The parameter information can be stored in the integrated circuit during or after mastering. Additional information on record carriers comprising integrated circuits can be found in the already mentioned International application with international publication number WO 02/17316 A1 (=PH-NL010233) and in the documents mentioned therein.

The label to be written on the record carrier can be used for all kinds of different applications. The most obvious application is to use the disc label technique as a means of identification of recorded media for the end-user. Another application resides in the realm of copy protection. The label can than serve as a hard-to-copy visual watermark of the content.

The disc label can be written on different places of the disc. It can for example be placed after the regular data, either inside or outside the lead-out area, but it can also be positioned in an inner diameter ring, or in rings between the normal data. It is also possible to insert the label among the regular data area. In general, the label can be written on any possible place on the read-out side of the disc.

The label can be written on the record carrier in many different ways. International application with international publication number WO 02/41316 A1 (=PH-NL010604), which document is hereby incorporated by reference, discloses a record carrier with a watermark which is stored on the record carrier by using a certain freedom in the channel code for introducing a predefined run length distribution in the marks to be stored on the record carrier. It is also possible not to store the label in the data area of the record carrier, but to use a predefined non-information area of the record carrier. In such an area marks with repeated minimum or maximum runlengths are written for creating the required visual effect. This is for example disclosed in U.S. Pat. No. 5,608,717, which document is hereby incorporated by reference.

With reference to FIG. 6, an example of the procedure for writing a label on a record carrier according to the invention is explained. In this example, the following steps are taken:

1. Select the label to be written on the record carrier (e.g. the label on FIG. 6A),
2. Read out the parameter information relating to the required physical parameter(s) from the record carrier,
3. Start with the first data byte to be written on the disc,
4. Derive the polar coordinates (r, φ) of that byte using the physical parameter information (see FIG. 6B),
5. Convert to the corresponding pixel coordinates in the label image,
6. Determine the corresponding pixel value in the label image,
7. Select the required channel symbol,
8. Repeat from 4 for the next data bytes to be written on the disc.

This is a computationally very expensive approach. By using the repeated nature of the pixel values at certain positions, the computational time required can be reduced. To this end, the edges of the label pattern must first be found, e.g. to find the next label pixel that has a different pixel value.

The inventors have found out that many DVD discs are mastered with such stability that the use of parameter information relating to two physical parameters can be sufficient for creating a visual label with negligible distortions. However, the use of parameter information relating to only one physical parameter can be sufficient for certain applications. For other applications, parameter information relating to more than two parameters might be required.

Although the invention has been elucidated with reference to the embodiments described above, it will be evident that other embodiments may be alternatively used to achieve the same object. The scope of the invention is therefore not limited to the embodiments described above, but can be applied to all kinds of record carriers, read-only as well as recordable/rewritable ones, adhering to certain, pre-defined physical parameters.

It must also be noted that the invention is not limited to the storage of parameter information relating to one physical parameter. In order to further optimize the writing process of the label, information relating to different physical parameters can be combined. The invention is also not limited to certain physical parameters. All physical parameters which can be used for determining the position of a certain bit on the record carrier belong to the scope of the claims. This includes, besides the physical parameters already mentioned, the exact amount of data per revolution or the number of revolutions on a disc. The invention is also not limited to certain methods for writing a label on a record carrier. All methods which use a physical parameter for writing a label on the read-out side of a record carrier can be used for writing such a label on the record carrier according to the invention. The invention is also not limited to a certain use of the parameter information present on the record carrier according to the invention. Although writing of a visible label is a preferred application of this parameter information, all kinds of uses relating to reading and writing of data can be applied using this parameter information.

It must further be noted that the term "comprises/comprising" when used in this specification, including the claims, is taken to specify the presence of stated features, integers, steps or components, but does not exclude the presence or addition of one or more other features, integers, steps, components or groups thereof. It must also be noted that the word "a" or "an" preceding an element in a claim does not exclude the presence of a plurality of such elements. Moreover, any reference signs do not limit the scope of the claims; the invention can be implemented by means of both hardware and software, and several "means" may be represented by the same item of hardware. Furthermore, the invention resides in each and every novel feature or combination of features.

The invention can be summarized as follows: the invention relates to a record carrier comprising an area for storing data, the record carrier adhering to a pre-defined, standardized condition with respect to a physical parameter. The record carrier comprises parameter information on the physical parameter, which parameter information is of a higher precision than the precision of the physical parameter mentioned in the pre-defined, standardized condition. Using this high precision parameter information, it is possible to derive the exact position of a visible image pixel data making up a label. This parameter information thus enables a recorder to write a visible label on the record carrier according to the invention.

The invention claimed is:

1. A record carrier (1) comprising an area for storing data, the area comprising a pattern of tracks (3) for storing the data in the form of marks, the record carrier adhering to a pre-defined, standardized condition with respect to a track pitch, wherein the record carrier comprises an area for storing higher precision track pitch parameter information, indicated in at least three decimals, which higher precision track pitch parameter information is of a higher precision than the precision of the standardized track pitch expressed in two decimals, wherein the higher precision track pitch parameter information is to be used for assisting writing a visible label on the record carrier.

2. A record carrier according to claim 1, wherein the record carrier is a DVD-RW disc or a DVD+RW disc, and the average track pitch is 0.74 μm.

3. A record carrier according to claim 1, wherein the pattern of substantial parallel tracks exhibits a continuous sinusoidal deviation of the track from the average centerline (6), a so-called wobble (4.2), the track pitch parameter information being stored in the wobble.

4. A record carrier according to claim 1, wherein the pattern of substantial parallel tracks comprises grooves and lands, the grooves being wobbled guidance tracks, the lands being the areas between the grooves, the track pitch parameter information being stored in pits embossed on the lands, so-called pre-pits.

5. A record carrier according to claim 1, wherein the track pitch parameter information is stored in a pre-defined data field on the record carrier.

6. A record carrier according to claim 1, wherein the record carrier comprises a further area comprising an integrated circuit (7), the parameter information being stored in the integrated circuit.

7. A record carrier (1) comprising an area for storing data, the area comprising a pattern of tracks (3) for storing the data in the form of marks, the record carrier adhering to a pre-defined, standardized condition with respect to a channel bit length, wherein the record carrier channel bit length parameter information, indicated in at least two decimals is of a higher precision than the precision of the standardized channel bit length expressed in one decimal wherein the higher precision channel bit length parameter information is to be used for assisting writing a visible label on the record carrier.

8. A record carrier according to claim 7, wherein the record carrier is a DVD-RW disc or a DVD+RW disc, and the inner radius is 24.0 mm.

9. A record carrier according to claim 7, wherein the record carrier is a DVD-RW disc or a DVD+RW disc, and the average channel bit length is 133.3 nm.

10. A record carrier according to claim 7, characterized in that the pattern of substantial parallel tracks exhibits a continuous sinusoidal deviation of the track from the average centerline (6), a so-called wobble (4.2), the higher precision channel bit length parameter information being stored in the wobble.

11. A record carrier according to claim 7, wherein the pattern of substantial parallel tracks comprises grooves and lands, the grooves being wobbled guidance tracks, the lands being the areas between the grooves, the higher precision channel bit length parameter information being stored in pits embossed on the lands, so-called pre-pits.

12. A record carrier according to claim 7, wherein the channel bit length parameter information is stored in a pre-defined data field on the record carrier.

13. A record carrier according to claim 7, wherein the record carrier comprises a further area comprising an integrated circuit (7), the higher precision channel bit length parameter information being stored in the integrated circuit.

14. A record carrier (1) comprising an area for storing data, the area comprising a pattern of tracks (3) for storing the data in the form of marks, the record carrier adhering to a pre-defined, standardized condition with respect to an inner radius, wherein the record carrier comprises an area for storing higher precision inner radius parameter information indicated in at least two decimals, which parameter information is of a higher precision than the precision of the standardized inner radius expressed in one decimal, wherein the higher precision inner radius parameter information is to be used for assisting writing a visible label on the record carrier.

15. A record carrier according to claim 14, wherein the record carrier is a DVD-RW disc or a DVD+RW disc, and the inner radius is 24.0 mm.

16. A record carrier according to claim 14, wherein the pattern of substantial parallel tracks exhibits a continuous sinusoidal deviation of the track from the average centerline (6), a so-called wobble (4.2), the higher precision inner radius parameter information being stored in the wobble.

17. A record carrier according to claim 14, wherein the pattern of substantial parallel tracks comprises grooves and lands, the grooves being wobbled guidance tracks, the lands being the areas between the grooves, the higher precision inner radius parameter information being stored in pits embossed on the lands, so-called pre-pits.

18. A record carrier according to claim 14, wherein the higher precision inner radius parameter information is stored in a pre-defined data field on the record carrier.

19. A record carrier according to claim 14, wherein the record carrier comprises a further area comprising an integrated circuit (7), the higher precision parameter information being stored in the integrated circuit.

* * * * *